US006564189B1

(12) United States Patent
Nycz (10) Patent No.: US 6,564,189 B1
(45) Date of Patent: May 13, 2003

(54) UNIVERSAL METHODS AND APPARATUS FOR DETERMINING PRICES AND REWARDS WITHIN RETAIL TRANSACTIONS

(75) Inventor: Lew P. Nycz, Kinnelon, NJ (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/219,136

(22) Filed: Dec. 22, 1998

(51) Int. Cl.[7] .............................................. G06F 17/60
(52) U.S. Cl. ........................... 705/20; 705/26; 705/27; 705/14
(58) Field of Search ............................. 705/15–17, 20, 705/14, 22–23, 26–27, 33

(56) References Cited

U.S. PATENT DOCUMENTS

| | | | |
|---|---|---|---|
| 4,084,742 A | * 4/1978 | Silverman | 235/238 |
| 4,138,000 A | * 2/1979 | Hartup | 186/61 |
| 4,975,840 A | * 12/1990 | DeTore et al. | 705/4 |
| 5,056,019 A | 10/1991 | Schultz et al. | |
| 5,297,026 A | 3/1994 | Hoffman | |
| 5,448,471 A | 9/1995 | Deaton et al. | |
| 5,537,314 A | 7/1996 | Kanter | |
| 5,620,182 A | 4/1997 | Rossides | 273/138.2 |
| 5,649,114 A | 7/1997 | Deaton et al. | |
| 5,652,421 A | 7/1997 | Veeneman et al. | 235/381 |
| 5,675,662 A | 10/1997 | Deaton et al. | 382/137 |
| 5,682,983 A | * 11/1997 | Weaver et al. | 206/150 |
| 5,873,069 A | * 2/1999 | Reuhl et al. | 705/20 |
| 5,933,813 A | * 8/1999 | Teicher et al. | 705/26 |
| 2001/0032162 A1 | * 10/2001 | Alsberg et al. | 705/37 |
| 2002/0019885 A1 | * 2/2002 | Wilkman | 705/14 |
| 2002/0026440 A1 | * 2/2002 | Nair | 707/3 |
| 2002/0087384 A1 | * 7/2002 | Neifeld | 705/10 |

OTHER PUBLICATIONS

Muret, Innovative pricing strategies can be ticket to success, Amusement Business, Apr. 8, 1996, vol. 108 Issue15, p22, 2p, 1 graph.*
From Corporate ResourceNet, Site license bundle of 12 titles is half price, Heartsoft Software Company, source: The Journal, Dec. 1994, vol. 22 Issue 5, p22, 1/6p.*
Mannix et al., Travel watch, US News & World Report, Apr. 8, 1991, vol. 110, Issue 13, p69, 1/4p.*
Popkin, Superdiscounts for flexible fliers, US News & World Report, Jul. 16, 1990, vol. 109 Issue 3, p58, 3p.*
Day, Retailers, customers believe in second chances, from Des Moines Business Record, Jul. 31, 1995, vol. 91 isue 31, p10.*
Gelsi, Sony builds on movie perq push, Brandweek, Sep. 9, 1996, vol. 37 Issue 35, p6, 14p.*
From Corporate ResourceNet, Traveler's notes, Source: Consumer Reports Travel Letter, Apr. 1997, vol. 13 Issue 4, p90, 4p.*

* cited by examiner

Primary Examiner—Cuong Nguyen
(74) Attorney, Agent, or Firm—Priest & Goldstein, PLLC

(57) ABSTRACT

A universal price/reward system for determining product prices or reward values. The system disclosed is implemented by utilizing a table of prices, reward information, or the like distinct from a POS system's existing Price Look-Up (PLU) file format. The table data utilized may be appended to an existing PLU file, or it may exist in a separate file located on the same file server, or on a separate file server. This approach allows a retail merchant to easily create and modify incentive pricing programs and promotional reward programs without having to modify the basic structure of the PLU file or the POS application program. The universal price/reward system can be implemented as part of the PLU file, or through a separate companion file on a POS store controller or file server.

15 Claims, 6 Drawing Sheets

| TABLE LENGTH | | 7 |
|---|---|---|
| REPEAT INDEX START | | 7 |
| REPEAT INDEX END | | 7 |
| PRICE/REWARD TABLE | ENTRY 1 | 1.29 |
| | ENTRY 2 | 1.09 |
| | ENTRY 3 | 1.09 |
| | ENTRY 4 | 0.89 |
| | ENTRY 5 | 0.89 |
| | ENTRY 6 | 0.89 |
| | ENTRY 7 | 0.79 |

| TABLE LENGTH | | 2 |
|---|---|---|
| REPEAT INDEX START | | 1 |
| REPEAT INDEX END | | 2 |
| PRICE/REWARD TABLE | ENTRY 1 | 1.29 |
| | ENTRY 2 | 1.09 |

| TABLE LENGTH | | 7 |
|---|---|---|
| REPEAT INDEX START | | 7 |
| REPEAT INDEX END | | 7 |
| PRICE/REWARD TABLE | ENTRY 1 | 1.29 |
| | ENTRY 2 | 1.09 |
| | ENTRY 3 | 1.09 |
| | ENTRY 4 | 0.89 |
| | ENTRY 5 | 0.89 |
| | ENTRY 6 | 0.89 |
| | ENTRY 7 | 0.79 |

FIG. 4B

| TABLE LENGTH | | 2 |
|---|---|---|
| REPEAT INDEX START | | 1 |
| REPEAT INDEX END | | 2 |
| PRICE/REWARD TABLE | ENTRY 1 | 1.29 |
| | ENTRY 2 | 1.09 |

| CUSTOMER NUMBER | | 012345 | |
|---|---|---|---|
| VARIABLE NAME – PRIOR QUANTITY | ENTRY 1 | 01 | 3 |
| | ENTRY 2 | 06 | 5 |
| | ENTRY 3 | 25 | 1 |
| | ENTRY 4 | 77 | 11 |

UNIVERSAL METHODS AND APPARATUS FOR DETERMINING PRICES AND REWARDS WITHIN RETAIL TRANSACTIONS

FIELD OF THE INVENTION

The present invention relates generally to improvements in the creation and utilization of various methods of determining pricing and reward incentives within a retail transaction. In particular, the invention relates to advantageous methods and apparatus for calculating the price to be paid, or the amount of a reward to be given, for a given quantity of an item or grouping of items purchased. The present invention allows flexibility in changing the pricing, rewards, incentives and the like without the need to re-program application program code when those changes are made.

BACKGROUND OF THE INVENTION

Retailers have traditionally used a variety of pricing methodologies to incent customers to shop in their stores and to purchase more of a given product during a shopping trip. Among the earliest pricing incentives were those that were used to offer a percentage discount, a fixed amount discount or a quantity discount, such as three units for one dollar. With the introduction of programmable Point-of-Sale (POS) equipment, retailers developed many variations on these simple incentive pricing methods. Modern POS application programs typically use a Price Look-Up (PLU) file to contain the necessary pricing, product identification, product grouping and bar code information for all items carried in the retail establishment.

As retailers have demanded greater pricing flexibility options from their POS suppliers, the suppliers have generally responded by adding additional program fields to the record format structure used in the PLU file. In order to implement different pricing methods, the POS application programs then need to be modified to interpret the additional PLU record fields to achieve the desired incentive pricing result. One major problem faced by the POS suppliers is that they can never anticipate all of the possible pricing and reward combination features that their end-user customers will demand. This has resulted in a continuous cycle where the POS suppliers have added features to their application programs in response to demands from their customers. One outcome from this cycle is that the POS suppliers have modified their PLU file formats by adding additional fields and increasing the length of those fields to anticipate the demands of their customers.

In recent years, there has been a trend in the retail industry where the retailers have sought open systems from their POS suppliers. The earliest POS systems were comprised of hardware and software that were proprietary to a given manufacturer, requiring the retailer to purchase all of their POS system components from the same supplier. While this proprietary approach helped to ensure that all the components of a given system worked together properly, it also tended to force a given retailer to stay locked into one POS supplier's equipment for a long time. By contrast, an open system is one in which the hardware and software interfaces are designed around common standards that are widely known and accepted. Although it is now possible to purchase the hardware, operating system software and application program software components separately, there are still few accepted standards in the industry for file structures and interfaces. This is true for the file structure of PLU files. The result is that retailers are still faced with the expensive problem of modifying their POS application programs and PLU file structures whenever they choose to implement different pricing or reward incentive methods. This problem is further compounded by the difficulties of having to make frequent programming changes to older POS application programs that were written in computer languages such as ASSEMBLER, BASIC and other legacy languages. Retailers are having an increasingly difficult time finding skilled programmers that are fluent in these languages. As POS suppliers have moved to more open technologies for new POS solutions, many retailers are now forced to bear the expense of maintaining or modifying these older POS application programs and the associated PLU record file structure in order to implement new pricing methods and reward incentive plans such as frequent shopper programs. These frequent shopper programs typically consist of rewarding frequent shoppers with various benefits. Such benefits include discounts for selected merchandise given at the time of purchase, notification of future promotions, as well as point accumulation rewards for repeat customer purchases over time.

SUMMARY OF THE INVENTION

The present invention recognizes that there exists a need in a variety of contexts for a method of changing pricing and reward values more readily within a POS system. Such a method should advantageously allow the pricing or reward incentive value and structure to be changed without requiring modifications to the PLU file structure and the POS application program each time such changes are desired. Such modifications may include changing the number of fields and the field lengths contained within the PLU file, as well as changes to the POS application program that might also be required to interpret the changes to the PLU file structure.

To this end, among its other aspects, the present invention provides a universal method and apparatus for changing pricing and reward values within a retail transaction. One aspect of the present invention includes a method for setting the price or reward value for one item, or a grouping of items, based upon the quantity of that item, or grouping, purchased. The methods and apparatus described also allow for setting a price or reward value for multiple purchases of an item, or grouping of items, by a given customer over a period of time. The methods and apparatus described also provide the capability to repeat a sequence of different prices and reward levels based upon cumulative purchases. As described in greater detail below, the present invention may be much more readily implemented than existing methods, while providing more flexibility to make price and reward value changes than existing methods.

A more complete understanding of the present inventions, as well as further features and advantages, will be apparent from the following Detailed Description and the accompanying drawings.

DETAILED DESCRIPTION

The disclosed and presently preferred embodiment is in the context of a point of sale (POS) system. However, the universal method of determining prices and rewards of the present invention can also be advantageously incorporated into Web based ordering, operator assisted telephone ordering, stand alone (POS) terminals or any application or apparatus that uses an item code method of determining prices.

Figure 1:
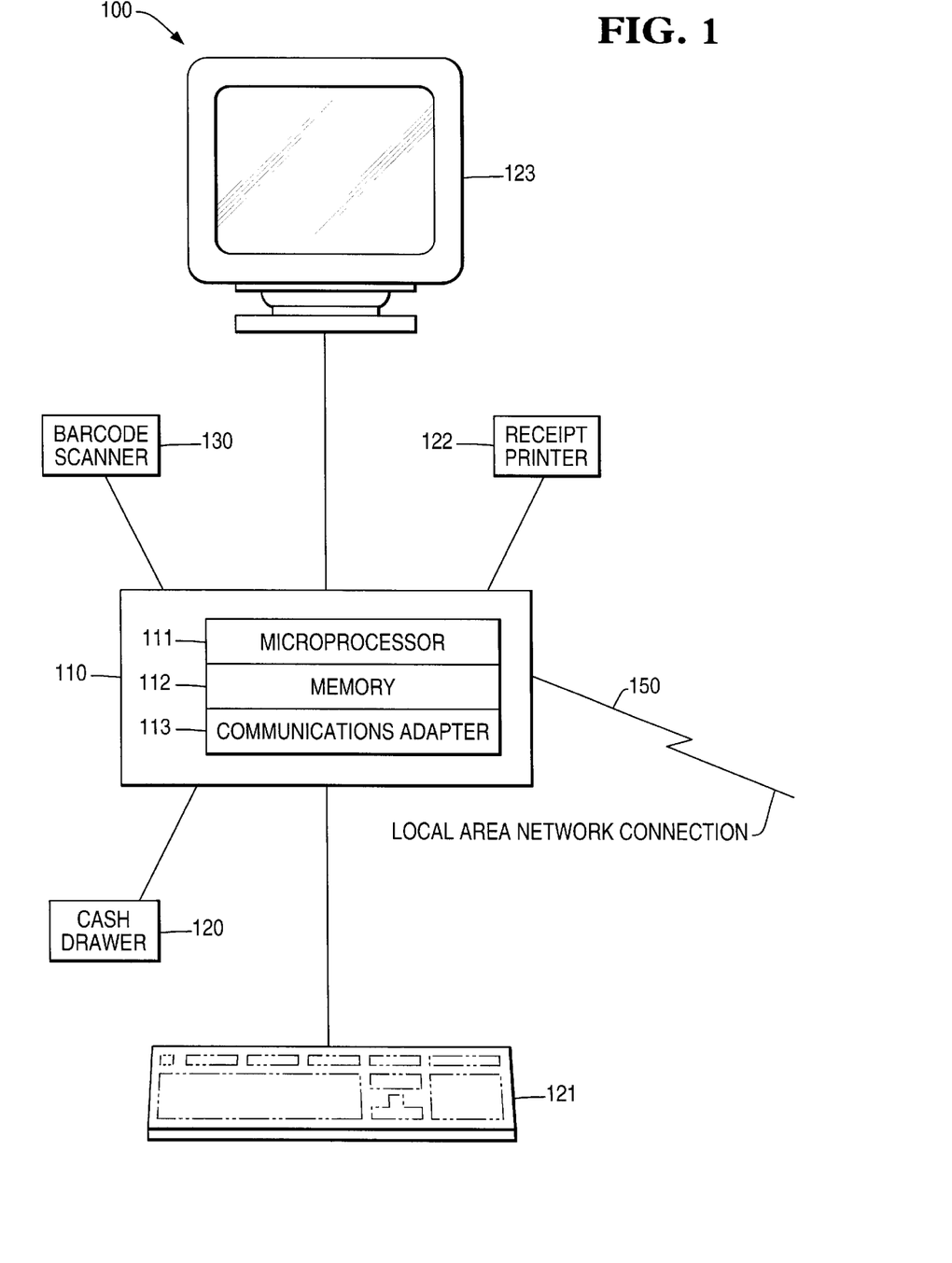
FIG. 1 illustrates a POS terminal suitable for use in conjunction with the present invention.

FIG. 1 illustrates a POS terminal 100 adapted for use in conjunction with the present invention as described further below. A base unit 110 includes a microprocessor 111, memory 112 and a communications adapter 113. The POS terminal 100 communicates with other computers via the communications adapter 113 via the local area network connection 150. Peripheral input and output devices are connected to the base unit 110, including an operator keyboard 121, an operator display 123, a cash drawer 120, and a receipt printer 122 for printing paper receipts. A barcode scanner 130 is also connected to the base unit.

The POS terminal 100 is adapted for use in conjunction with the present invention by storing software in memory 112 of the POS terminal. This software performs the routines required to determine the price or reward value of the items scanned by the barcode scanner 130.

Figure 2:
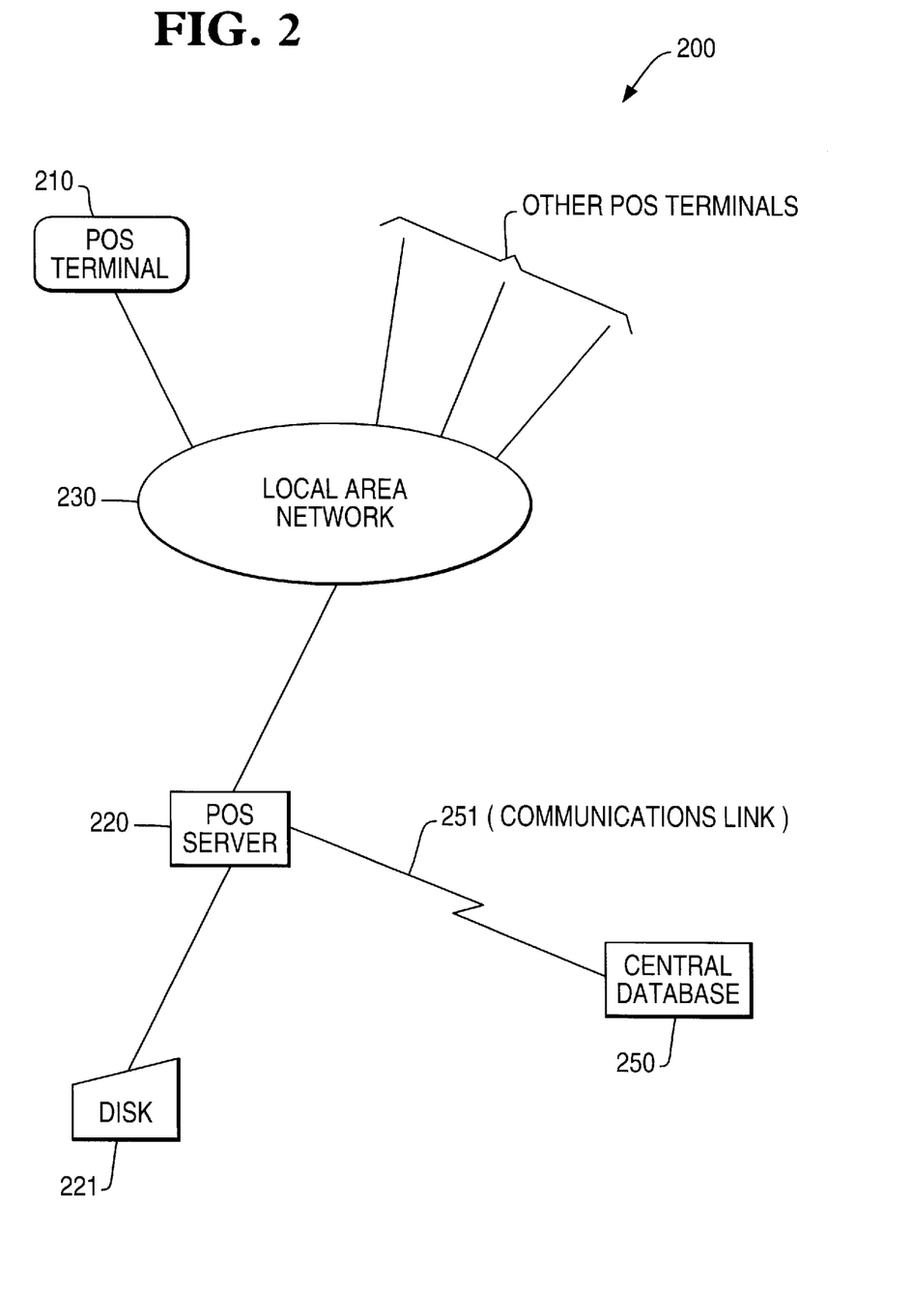
FIG. 2 illustrates a POS store system suitable for implementing one embodiment of the present invention.

FIG. 2 illustrates a POS store system 200, including one or more POS terminals 210 and one or more POS servers 220 that provide price data and universal price/reward value records to the POS terminals 210. The item pricing data may be contained in a price look-up (PLU) file and the universal price/reward value records may be contained in the PLU file, or a separate universal price/reward file stored on a disk drive 221. The POS store system 200 may include a central database 250 remotely located from the store and connected to the POS server via a communications link 251.

Figure 3:
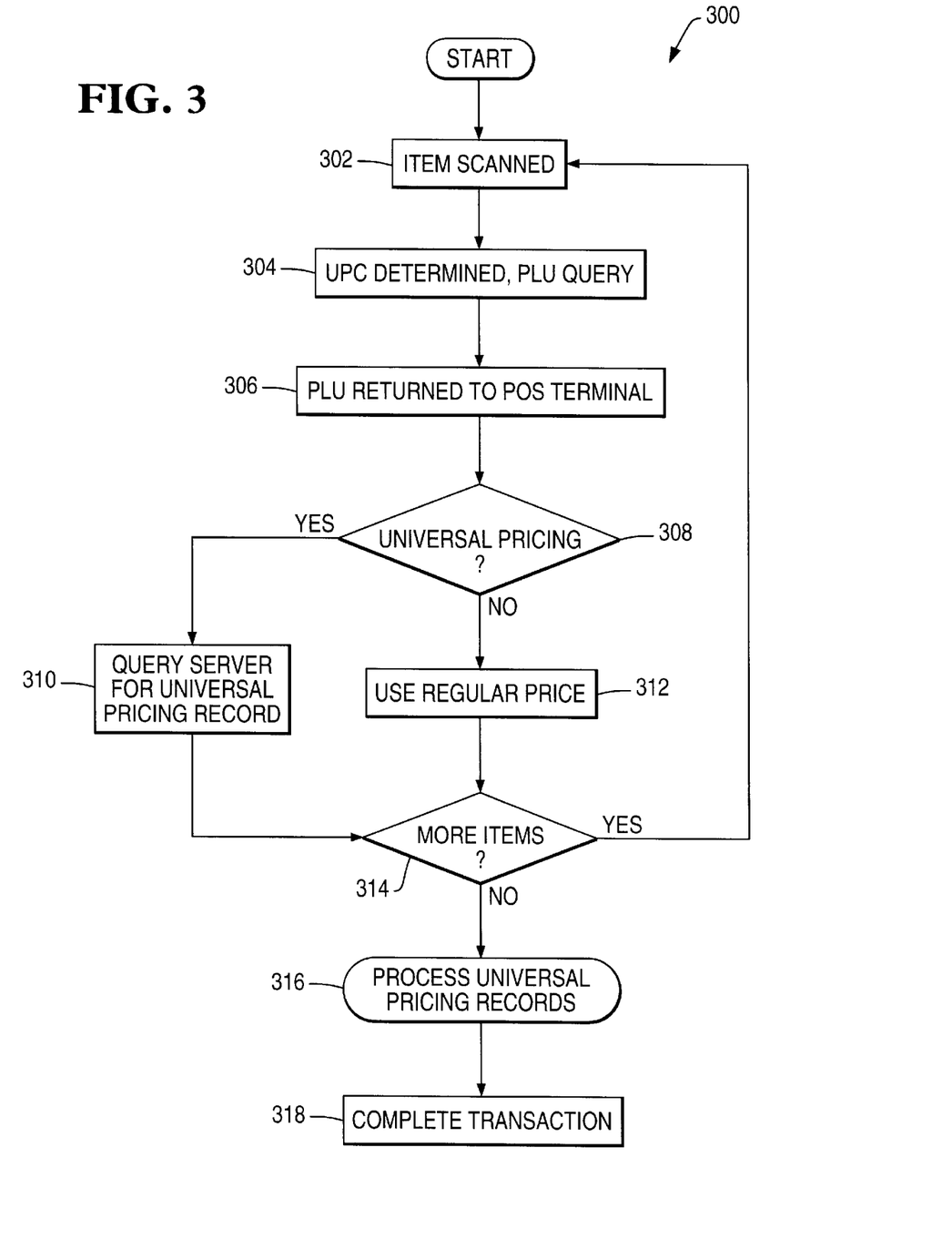
FIG. 3 illustrates a process for determining item pricing or reward level within a single transaction in accordance with the present invention.

FIG. 3 illustrates a procedure 300 for determining the item price or reward value in accordance with one aspect of the present invention. The process begins at process step 302, when the barcode of an item is scanned by a scanner such as the barcode scanner 130 of FIG. 1. At step 304, the barcode scanner provides the Universal Product Code (UPC) to the POS application program, which in turn sends a query to a file server such as the POS server 220 in FIG. 2. While the present invention makes reference to UPC codes, it will be recognized that other codes may also be suitably employed. At process step 306, the POS server returns the PLU record to the POS terminal. The PLU record is read at step 308 to determine the item price and to determine if there is a universal price/reward record available for the item. If there is no universal price or reward record for the scanned item, the process proceeds to step 312. At this step, the item price is read from the PLU record and the transaction total is incremented. At process step 314, the POS application program waits for the next item to be scanned, or for the POS terminal operator to indicate that there are no more items to be scanned. If another item is scanned, the process returns to step 302, wherein steps 304 through 314 are repeated. The POS operator would indicate that there are no more items to be scanned by pressing a total key on the operator keyboard such as the operator keyboard 121 in FIG. 1. If step 308 determined that there was a universal price/reward record for the scanned item, the process would proceed to step 310 and the POS application program would send a query for the universal price/reward record to the POS server. Alternately, the PLU record may contain the universal price/reward record within the PLU file, obviating the need for a separate query in step 310. As a further alternative, the PLU query of step 304 may execute a simultaneous query of the universal price/reward file, if such file exists separately from the PLU file. When the operator indicates that there are no more items to be scanned, the process proceeds to step 316, wherein the collected universal price/reward records are processed. It will be recognized that the processing of said universal pricing records in step 318 may vary based upon the particular implementation of the universal price/reward system. For example, in one implementation, each scanned quantity of a given item may be priced at the normal regular price. Then, when the universal price record is processed, the POS application program may credit the total discount allowed on the sum of the quantity purchased, and indicate as such in a single line item on the customer's printed receipt. In another implementation, the universal price record is processed as each item is scanned and the discount is displayed and printed immediately. Another implementation may sort the purchased items before applying the discount or reward. This is useful in properly applying per dollar or per pound types of rewards. The process ends at step 318 when the POS operator indicates that the transaction is completed by pressing a tender type key on the POS terminal operator keyboard.

Figure 4A:
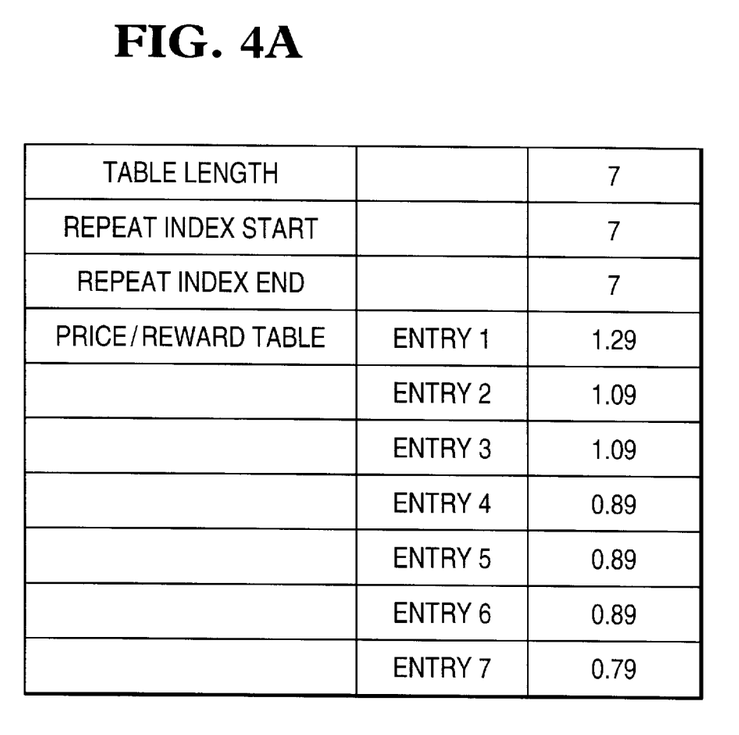
FIG. 4A illustrates a universal price table in accordance with the present invention.
Figure 4B:
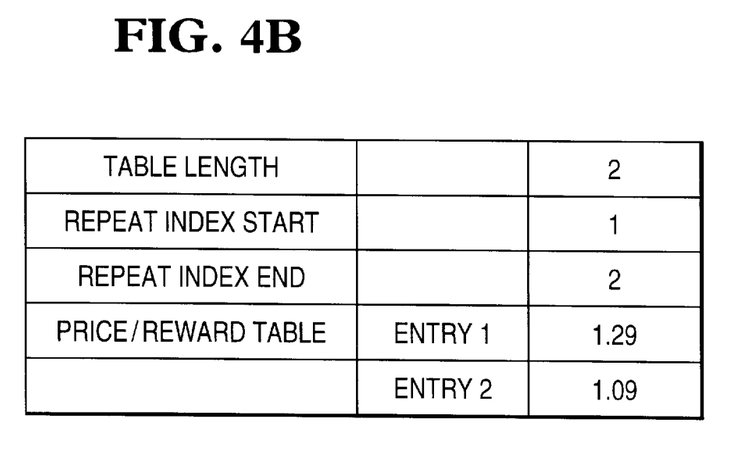
FIG. 4B illustrates a universal price table in accordance with the present invention.

A preferred embodiment of the present method comprises three elements. The first element is a table of price or reward values, the second element is a mechanism for identifying the end of the table and the third element is a mechanism for indicating a point of repetition. In this implementation, the table of price or reward values contains a one element list that correlates an item price or reward value with the quantity of an item, or grouping of items. Another implementation may utilize a two element list. The first element is the count of items at the price or reward value specified in the second element. FIG. 4A illustrates a one element table where the first quantity of a given item is associated with the first price, the next unit of the same item is associated with the next price, and so on for subsequent units. The preferred embodiment applies such pricing values for all units of a given item purchased at one time. For example, if an item is $1.29 for one unit but is being promoted as two units for $2.38, the method uses a table look-up to determine that the first unit is $1.29 and the second is $1.09 for a total of $2.38. A method for identifying the end of the table, such as a table length variable or table end flag, is used to determine the price of any quantities of an item that exceeds the number of entries in the list. For example, if a table length variable indicates that there are seven entries in the table, all units in excess of six are priced the same as the seventh entry, or $0.79 in this example. This method allows for determining the price or reward value for large quantities of an item without having to provide an equally long table of prices or reward values. This method also allows for indicating a repetition point in the table of price or reward value entries. This repetition point is utilized to allow for a repetitive sequence of price or reward values within the table of values without having to provide a large table of repeating values. In this implementation, FIG. 4B illustrates an example where the table entries are set to result in two units selling for $2.38 with no further discounting. In this example the 'Repeat Index Start' entry has been set to quantity 1 and the 'Repeat Index End' has been set to quantity 2. In another implementation, the 'Repeat Index End' may always be assumed to be the end of the given price or reward table. Thus, the price for each unit would alternate between the first two price entries, yielding a price of two units for $2.38. For example, the third unit would be $1.29 for a total of $3.67, and the fourth unit would be $1.09, resulting in a total of $4.76 for four units. In this embodiment of the present invention, the POS application program withholds the printing of the customer receipt until all items are scanned, allowing all quantities of a given item to be grouped together on the paper receipt.

Figure 6:
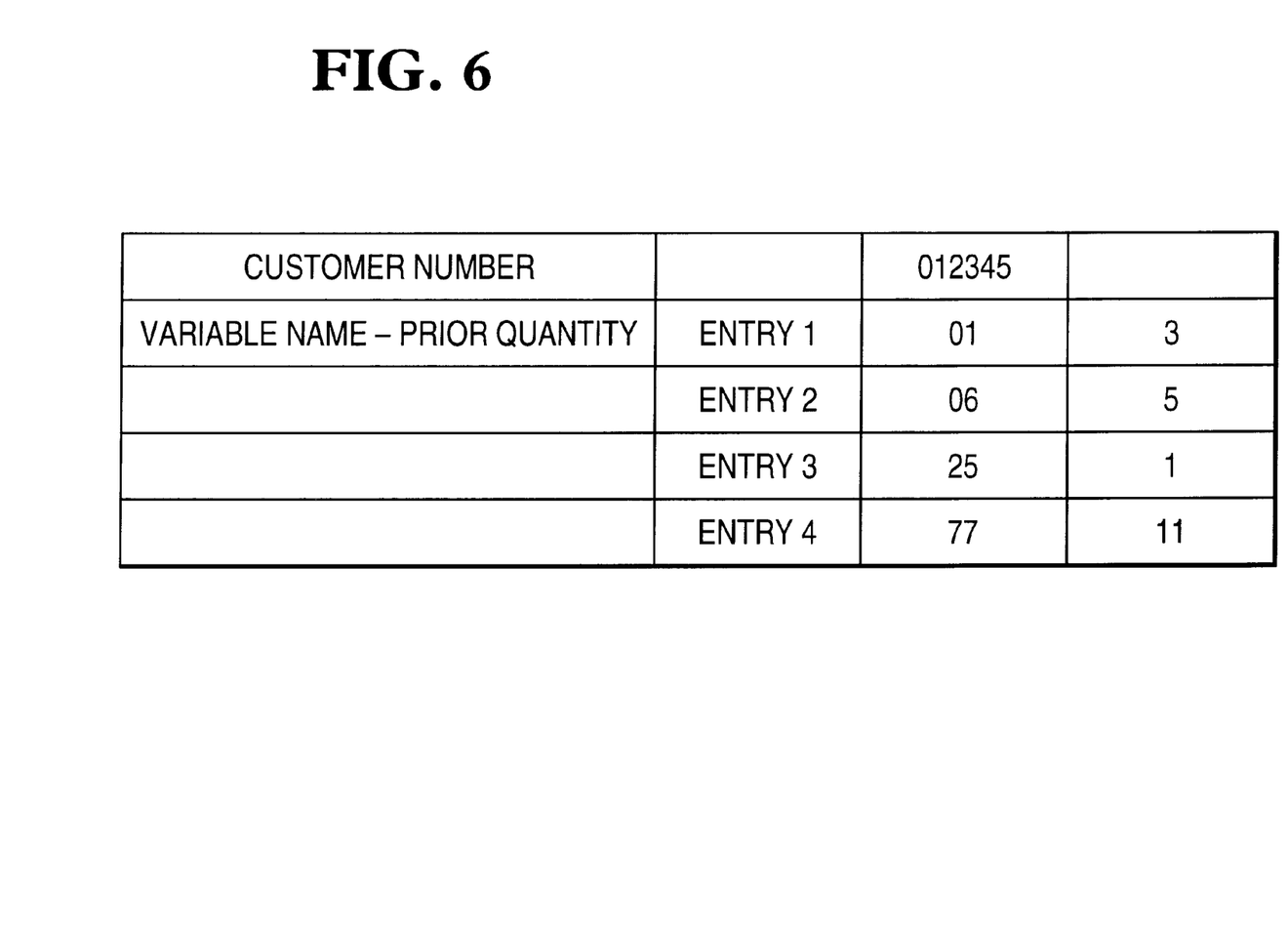
FIG. 6 illustrates a table recording prior purchase quantities of various items in accordance with the present invention.

In another embodiment of the present invention, the universal pricing method can also be applied to subsequent purchases of a given item at the same physical store location, or at other stores within a retail chain. This may be accomplished by adding a fourth element to the method described above that writes an entry into a record in a central database. This record is keyed to some type of customer identification, such as a frequent shopper program identification number. FIG. 6 illustrates such a record, wherein a customer specific record contains multiple named variables which can be used as counters to track specific items or group of items purchased in past transactions by that customer. The first entry in the record contains the customer number. Subsequent entries contain the variable name and quantity of such item or group of items purchased in past transactions. The variable name may be a PLU number or a user assigned ID to track a grouping of items.

Figure 5:
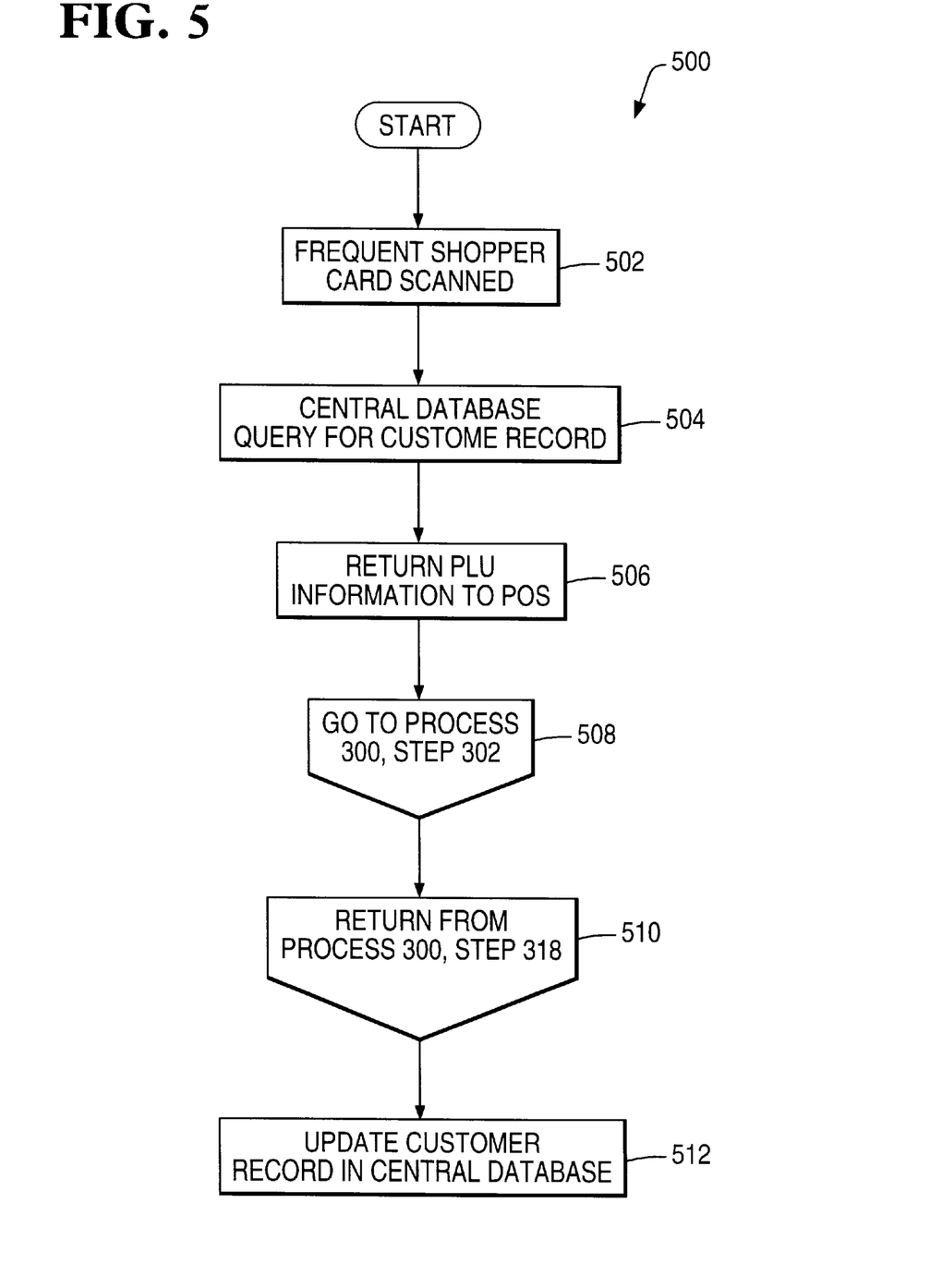
FIG. 5 illustrates a process for determining item pricing or reward level within subsequent transactions in accordance with the present invention.

FIG. 5 illustrates a procedure 500 for accumulating the past purchase activity of a frequent shopper in a grocery store. The process begins at step 502, wherein the customer would present a barcoded frequent shopper card to the cashier to be scanned. At process step 504, the POS application program would send a query to a central database facility, such as the central database 250 in FIG. 2. The central database facility returns the query at step 506, with the PLU information and prior purchase quantities as illustrated in FIG. 6. The process then proceeds to step 302 of process 300 as illustrated in FIG. 3. At step 316 of process 300, the POS application program would utilize the PLU information from the central database query to determine the proper entry point into the each of the appropriate universal price and/or reward value records. For example, instead of starting at quantity 1 for PLU number 01 as illustrated in FIG. 6, the POS application program at step 316 of process 300 would determine that this customer had already purchased 3 units, and subsequently price the first unit of this transaction at the price corresponding to the fourth table entry, or $0.89 as illustrated in FIG. 4A. After the transaction is completed at step 318 of process 300, the POS application program returns to process 500 at step 510. At step 512, the customer's record of prior purchases is updated in the central database facility. In this embodiment of the present invention, the POS application program may withhold the printing of the customer receipt until all items are scanned such that all quantities of a given item are grouped together on the printed receipt.

I claim:

1. A computer implemented method for determining a price of at least a first and a second item of the same type and identified by a common bar code which are purchased as part of a single transaction in which it is desired to charge a different price for the first and second items, the method comprising the steps of:

storing a universal price record in a universal price record memory, said universal price record including a table correlating a first price with the first item and a second price with the second item purchased as part of a single transaction, said universal price record including a file format distinct from a file format of a price look-up record;

scanning the first item;

querying a memory for the price look-up record to determine if the universal price record exists for the first item;

reading the first price from the universal price record memory and using the first price for the first item, if the universal price record exists for the first item;

reading the first price from the price look-up record, if the universal price record does not exist;

scanning the second item;

reading the second price from the universal price record memory and using the second price for the second item, if the universal price record exists for the first item;

reading the second price from the price look-up record if the universal price record does not exist; and tallying the first price and the second price as part of a retail transaction.

2. The method of claim 1 wherein a plurality of additional items of the same type are to be purchased as a part of the single transaction and the table of the universal price record correlates a price for each additional item of said plurality of additional items, the method further comprising the steps of:

reading subsequent prices for the plurality of additional items from the universal price record memory and using the subsequent prices for subsequent items.

3. A computer implemented method for determining a promotional price of at least a first and a second item of the same type and identified by a common bar code which are purchased as part of a single transaction in which it is desired to charge a different price for the first and second items, the method comprising the steps of:

scanning the first item;

querying a memory for a price look-up record;

determining if a universal price record exits for the scanned item;

querying a memory for the universal price record, said universal price record including a table correlating a first price with the first item and a second price with a second item, said universal price record including a file format distinct from a file format of the price look-up record;

reading the first price from the universal price record memory and applying the first promotional price to the first item, if the universal price record exists for the first item;

reading the second price from the universal price record memory and applying the second promotional price to the second item, if the universal price record exists for the second item;

reading the first and second prices from the price look-up record if the universal price record does not exist for the first and second items; and tallying the first price and second price as part of a retail transaction.

4. The method of claim 3 wherein a plurality of additional items of the same type are to be purchased as a part of the single transaction in which it is desired to charge different prices for the additional items and the table of the universal price record correlates a price for each additional item of said plurality of additional items, the method further comprising the step of:

reading subsequent prices for the plurality of additional items from the universal price record memory and applying the subsequent prices to subsequent items.

5. The method of claim 4 wherein the universal price record includes a table length field, and further comprising the steps of:

reading the table length field;

determining if the quantity of the subsequent item exceeds the value of the table length field; and utilizing the last price entry for each quantity of the plurality of items that exceeds the value of the table length field.

6. The method of claim 5 wherein the universal price record includes a repeat index start field and a repeat index stop field, and further comprising the steps of:

reading the repeat index start field and the repeat index stop field;

determining if the quantity of the subsequent item exceeds the value of the table length field; and utilizing the price entry that correlates to the value of the repeat index start field for the first quantity of the plurality of items that exceeds the value of the table length field.

7. The method of claim 6 wherein subsequent price entries are utilized for subsequent quantities of the plurality of items purchased, and further comprising the steps of:

determining if the quantity of the subsequent items exceeds the value of the repeat index stop field;

utilizing the price entry that correlates to the value of the repeat index start field for the first quantity of the plurality of items that exceeds the value of the repeat index stop field; and repeating the steps until a price entry is determined for each quantity of the plurality of items.

8. A computer implemented apparatus for determining a price of a subsequent unit of an item of a type previously purchased as part of a series of prior transactions, the computer implemented apparatus comprising:

means for entering a customer frequent shopper number for the present customer;

means for querying a memory for a customer record;

a scanner for scanning the item;

means for querying a memory for a price look-up record and for determining if a universal price record exists for the scanned item, said universal price record comprising a table correlating a first price for a first item of a given type and subsequent prices for subsequent items of the same type purchased as part of a series of transactions, said universal price record including a file format distinct from a file format of a price look-up record;

means for querying a memory for the universal price record;

means for reading the price from the universal price record memory;

means for updating the customer record to add the subsequent unit of the item purchased to the quantity of prior purchases; and a printer for producing a customer receipt.

9. A computer implemented method for determining a price of a subsequent unit of an item of a type previously purchased as part of a series of prior transactions in which it is desired to charge a different price for the item, both items identified by a common bar code, the method comprising the steps of:

entering a customer frequent shopper number for the present customer;

querying a memory for a customer record, said customer record including the customer frequent shopper number and a table correlating an named variable with a quantity of prior purchases of said item;

scanning the item;

querying a memory for a price look-up record;

determining if a universal price record exits for the scanned item;

querying a memory for the universal price record, said universal price record including a table correlating a first price for a first item of a given type prices for subsequent prices for subsequent items of the same type purchased as part of a series of transactions said universal price record;

reading the price from the universal price record memory;

updating the customer record to add the subsequent unit of the item purchased to the quantity of prior purchases; and producing a customer receipt, said customer receipt indicating the price charged for the subsequent unit.

10. The method of claim 9 wherein a plurality of additional items of the same type are to be purchased and the table of the universal price record correlates a price for each additional item of said plurality of additional items, the method further comprising the steps of:

reading subsequent prices for the plurality of additional items from the universal price record memory;

applying the subsequent prices; and updating the customer record to add the plurality of additional items purchased to the quantity of prior purchases of said item.

11. The method of claim 10 wherein a plurality of different types of items are purchased and the customer record includes a table of different item numbers correlated with the prior purchase quantities of said items; and updating the customer record to add the quantity of each different item type purchased to the prior purchase quantities of said different types of items.

12. A computer implemented method for determining a reward value of at least a first and a second item of the same type and identified by a common bar code which are purchased as part of a single transaction in which it is desired to give a customer a different reward value for the first and second items, the method comprising the steps of:

storing a universal price record in a universal price record memory, said universal price record including a table correlating a first reward value with the first item and a second reward value with a second item purchased as a part of a single transaction, said universal price record including a file format distinct from a file format of a price look-up record;

scanning the first item;

querying a memory for the price look-up record to determine if the universal price record exists for the first item;

reading the first reward value from the universal price record memory and applying the first reward value to the first item if the universal price record exists for the first item;

reading the first reward value from the price look-up record if the universal price record does not exist;

reading the second reward value from the universal price record memory and applying the second reward value to the second item if the universal price record exists for the second item;

reading the second reward value from the price look-up record if the universal price record does not exist; and tallying the first reward value and the second reward value as part of a retail transaction.

13. The method of claim 12 wherein a plurality of additional items of the same type are to be purchased as a part of the single transaction and the table of the universal price record correlates a reward value for each additional item of said plurality of additional items, the method further comprising the step of:

reading subsequent reward values for the plurality of additional items from the universal price record memory and applying these subsequent reward values to subsequent items.

14. A computer implemented method for determining a promotional reward value of at least a first and a second item of the same type and identified by a common bar code which are purchased as part of a single transaction in which it is desired to give a customer a different reward value for the first and second items, the method comprising the steps of:

scanning the first item;

querying a memory for a price look-up record;

determining if a universal price record exits for the scanned item;

querying a memory for the universal price record, said universal price record including a table correlating a first reward value with the first item and a second reward value with the second item, said universal price record including a file format distinct from a file format of the price look-up record;

reading the first reward value from the universal price record memory and applying the first reward value to the first item, if the universal price record exists for the first item;

reading the second reward value from the universal price record memory and applying the second reward value to the second item, if the universal price record exists for the second item;

reading the first and second reward values from the price look-up record if the universal price record does not exist for the first and second items; and tallying the first reward value and the second reward value as part of a retail transaction.

15. The method of claim 14 wherein a plurality of additional items of the same type are to be purchased as a part of the single transaction in which it is desired to give a customer different reward values for the additional items and the table of the universal price record correlates a reward value for each additional item of said plurality of additional items, the method further comprising the step of:

reading subsequent reward values for the plurality of additional items from the universal price record memory and applying those subsequent reward values to subsequent items.

* * * * *

UNITED STATES PATENT AND TRADEMARK OFFICE
CERTIFICATE OF CORRECTION

PATENT NO.     : 6,564,189 B1
DATED          : May 13, 2003
INVENTOR(S)    : Nycz, L.

It is certified that error appears in the above-identified patent and that said Letters Patent is hereby corrected as shown below:

Column 8,
Line 19, after "type" delete "prices".

Signed and Sealed this

Fourteenth Day of October, 2003

JAMES E. ROGAN
*Director of the United States Patent and Trademark Office*